United States Patent
Tippetts

(10) Patent No.: US 7,162,974 B2
(45) Date of Patent: Jan. 16, 2007

(54) MOTION GENERATING SQUIRREL FEEDER

(76) Inventor: Mark W. Tippetts, 1075 Country Road 782, Mountain Home, AR (US) 72653

( * ) Notice: Subject to any disclaimer, the term of this patent is extended or adjusted under 35 U.S.C. 154(b) by 89 days.

(21) Appl. No.: 11/155,528

(22) Filed: Jun. 20, 2005

(65) Prior Publication Data

US 2006/0283395 A1    Dec. 21, 2006

(51) Int. Cl.
*A01K 61/02* (2006.01)
(52) U.S. Cl. .................................... 119/57.8
(58) Field of Classification Search ............ 119/51.01, 119/51.03, 52.1–52.4, 57.8, 57.9; 40/455; D30/121–128, 132, 133
See application file for complete search history.

(56) References Cited

U.S. PATENT DOCUMENTS

| | | | | |
|---|---|---|---|---|
| 3,537,429 A | * | 11/1970 | Regan | 119/51.03 |
| 4,767,088 A | * | 8/1988 | Fielder et al. | 248/121 |
| D330,612 S | * | 10/1992 | Leach | D30/121 |
| 5,467,736 A | * | 11/1995 | Reynolds | 119/52.2 |
| 5,664,522 A | * | 9/1997 | Keller | 119/52.3 |
| 6,085,692 A | * | 7/2000 | Adams | 119/51.03 |
| 6,394,030 B1 | * | 5/2002 | Geiger et al. | 119/57.8 |
| 6,439,158 B1 | * | 8/2002 | Blohm | 119/57.8 |
| 6,474,260 B1 | * | 11/2002 | Shultz | 119/51.03 |
| 6,647,920 B1 | * | 11/2003 | Lovett | 119/52.2 |
| 6,662,746 B1 | * | 12/2003 | Laske, Jr. | 119/57.8 |
| 6,837,178 B1 | * | 1/2005 | Nall et al. | 119/57.8 |

* cited by examiner

*Primary Examiner*—Thomas Price
(74) *Attorney, Agent, or Firm*—Stephen D. Carver

(57) ABSTRACT

A metastable, motion generating squirrel feeder with a pair of coupled, generally V-shaped ribs attracts squirrels with corncobs secured at each rib end. Each rib has a pair of projecting wings symmetrically diverging away from a central vertex. The wings terminate in ends occupying the vertices of a virtual tetrahedron. Notches in the rib vertices enable rib coupling during assembly. Spaced-apart feed holders mounted on the wings each have a fixed bracket and a slidable bracket. Spikes projecting from each bracket towards the other captivate feed such as corncobs sandwiched between the brackets. A mounting ring non-rigidly captivates the vertice region of the ribs, loosely mounting the feeder and suspending it above ground so that the ribs are free to rotate and move in response to squirrels.

20 Claims, 11 Drawing Sheets

MOTION GENERATING SQUIRREL FEEDER

BACKGROUND OF THE INVENTION

I. Field of the Invention

The present invention relates generally to animal feeders. More particularly, the present invention relates to feeders that move vigorously in response to the presence and motion of feeding squirrels.

II. Description of the Prior Art

A variety of wild animal feeders, including numerous feeders designed specifically for birds and squirrels, are known in the art. Many hours of pleasure may be derived by feeding animals that are drawn to readily visible, properly placed feeders. Squirrels can be particularly entertaining.

Typically, squirrel feeders are solidly mounted in a highly visible elevated position. While some form of perch or shelf is often provided to support feeding squirrels, these animals are not at all particular about feeder configuration, as long as ample feed, usually corn, is generously provided. In other words, hungry squirrels are daring enough to visit feeders of almost any form, size, height, or shape.

Usually squirrel feeders are mechanically secured in a stable, fixed position. Rigid mounting techniques minimize feeder movements. However, inquisitive and aggressive squirrels have little, if any, fear of traveling over moving feeders, or visiting feeders that have moving parts. It is quite entertaining to watch nimble squirrels scurry over and under obstacles to reach feed. It is equally amusing to watch squirrels maneuver and move about as they visit a moving feeder and squirm to maintain their balance.

Squirrels love a variety of granular feeds, including those comprising various bird seeds and grains such as corn. To the consternation and dismay of bird watchers, squirrels are often attracted to bird feeders. Consequently, some bird feeders include means for limiting or discouraging squirrels. Another way to reduce the likelihood that squirrels will visit bird feeders it to provide separate squirrel feeders. When several well stocked squirrel feeders are strategically placed in a typical yard, the sometimes annoying squirrels can be lured away from bird feeders.

Although numerous granular feeds are commercially available for squirrels, unshelled corn cobs are readily available. Corn is highly desired by squirrels, and feeders equipped with an ample supply of corn are extremely effective in attracting squirrels. With granular feeders, some of the corn will inevitably drop downwardly to the ground to positions that are not easily observed. Furthermore, it takes less effort for squirrels to eat granular feed, reducing the viewing time available to observers, and increasing feed consumption. Feeders that use corn cobs require squirrels to work harder, and move about more. Simply stated, it takes more time and effort for squirrels to deplete corn cobs, and they must work harder. As a result, feeders that facilitate limited movements in response to squirrel visitation produce more motion, and become an attractive sight. Corn cobs are also desirable because ears of corn cannot be easily broken or thrown and scattered about, so less food is wasted.

I have found that it is desirable to provide a corn-cob feeder that moves vigorously when squirrels visit. Furthermore, it is desirable that such a feeder provides visiting squirrels with a decent perch with which to maintain their grip as movement occurs.

U.S. Pat. No. 6,564,746 issued to Burnham on May 20, 2003 shows a squirrel-powered feeder structure that utilizes energy produced by live squirrels to dispense feed from a storage hopper. The feeder is suspended above the ground from a tree branch or other structure. Feed, such as corn, stored within the hopper, drops to the ground to feed various wild animals including squirrels and deer. The feeder assembly comprises tubular feed container with a horizontal platform mounted on the bottom, a port hole for allowing feed particles to spill out onto the platform, and an agitating device that sweeps feed particles off the platform to the ground below. The agitating device is activated by the force generated by the weight and momentum of squirrels leaping back and forth from the tree trunk to the platform.

U.S. Design Pat. No. D337,861 issued to Ross Jul. 27, 1993 shows a squirrel feeder that holds several ears of corn.

U.S. Pat. No. 5,755,178 issued to Lush on May 26, 1998 shows a wild game feeder that is suitable for squirrels. An upwardly extending member supports a block of animal feed.

No prior art animal feeder known to me is adapted to maximize viewer entertainment by moving radically in response to squirrel visits.

SUMMARY OF THE INVENTION

My invention is a moving feeder that holds corn cobs, and which moves in response to animal visitation. Specially designed for squirrels, the feeder comprises a pair of opposed, generally V-shaped ribs that comprise projecting wings symmetrically diverging away from a vertex. Each of the wings terminates in ends occupying the vertices of a virtual tetrahedron. Preferably, each wing supports a pair of outwardly spaced-apart corn cob holders. Each corncob holder comprises a pair of brackets with suitable spikes for holding and captivating corncobs. The vertices of the twin ribs are joined together to form the center of the feeder, with the wings of one rib projecting in a first direction (i.e., upwardly, or to the left) and the wings of the other rib projecting oppositely (i.e., downwardly or to the right).

A circular mounting ring non-rigidly captivates the center of the feeder formed by the adjoining vertices. The ring loosely holds the feeder. The squirrel feeder is metastable and will tip and/or rotate when a squirrel tries to feed on the corn, causing the squirrel to scramble and do acrobatics while trying to stabilize himself. As corn is consumed, the squirrel feeder will eventually settle in a new and different metastable position.

Thus, both ribs are allowed to rotate generally about their vertices, as the wings unbalance the feeder in response to squirrel visitation. The mounting ring is tied directly to a suitable elongated wire or cord that is tied to a support such as a tree branch to dynamically elevate the feeder above ground.

Thus, a basic object is to provide an animal feeder that moves dynamically in response to animal visitation.

Another primary object is to provide a dynamic feeder of the character described that is ideal for squirrels and the like.

Yet another object is to provide a feeder of the character described that securely mounts corn cobs.

Another object of my invention is to provide a corn cob feeder that does not require mechanical devices such as motors, timers, batteries, or electronic components to produce motion. It is a feature of my invention that feeder movements are generated by gravity in response to the unbalancing of the feeder produced by squirrel visitation.

Another object of my invention to provide a feeder that is easily deployed upon a branch or other convenient support.

Yet another basic object is to provide a metastable squirrel feeder.

Another object is to provide a feeder ideally adapted for squirrels.

These and other objects and advantages of the present invention, along with features of novelty appurtenant thereto, will appear or become apparent in the course of the following descriptive sections.

BRIEF DESCRIPTION OF THE DRAWINGS

In the following drawings, which form a part of the specification and which are to be construed in conjunction therewith, and in which like reference numerals have been employed throughout wherever possible to indicate like parts in the various views.

DETAILED DESCRIPTION

Figure 1:
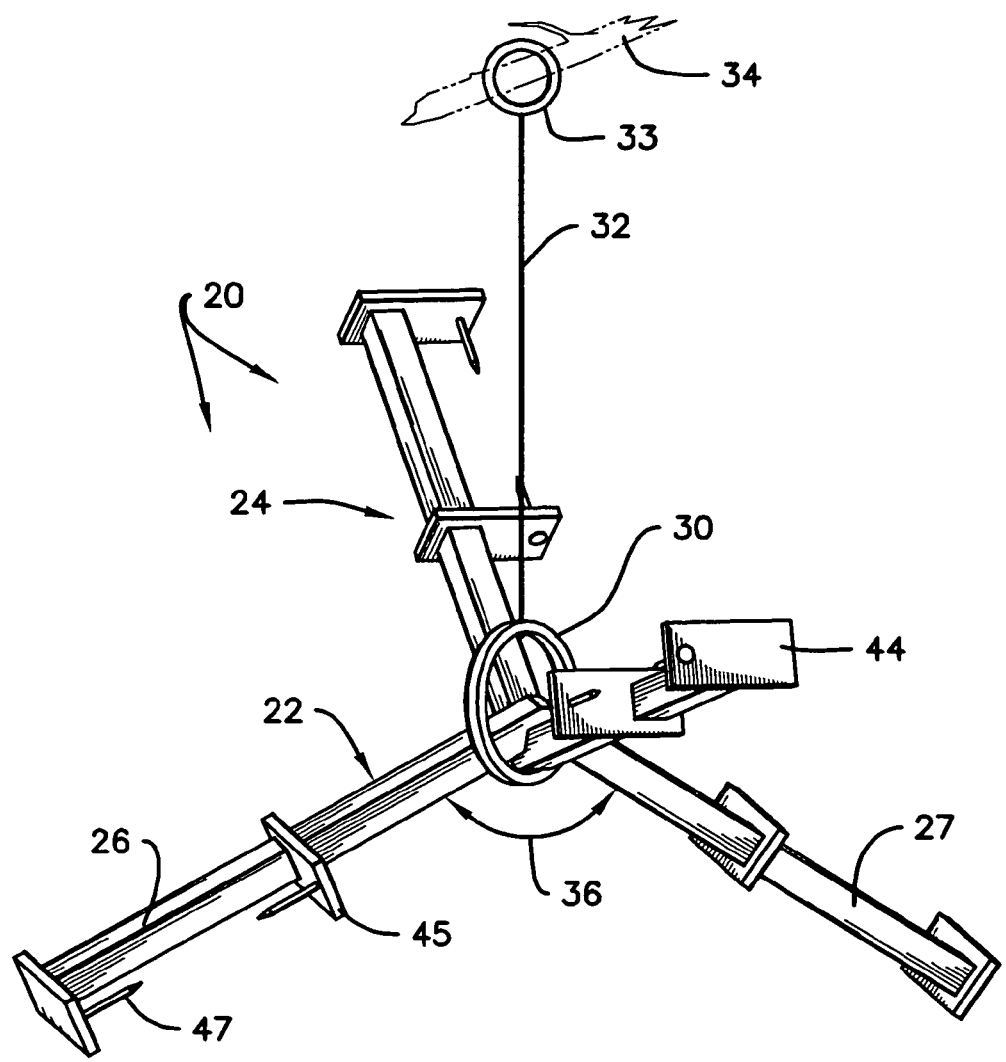
FIG. 1 is a frontal isometric view showing a preferred squirrel feeder constructed in accordance with the best mode of this invention, showing it one of many possible dynamic orientation, and with the preferred corn cobs omitted for clarity.
Figure 2:
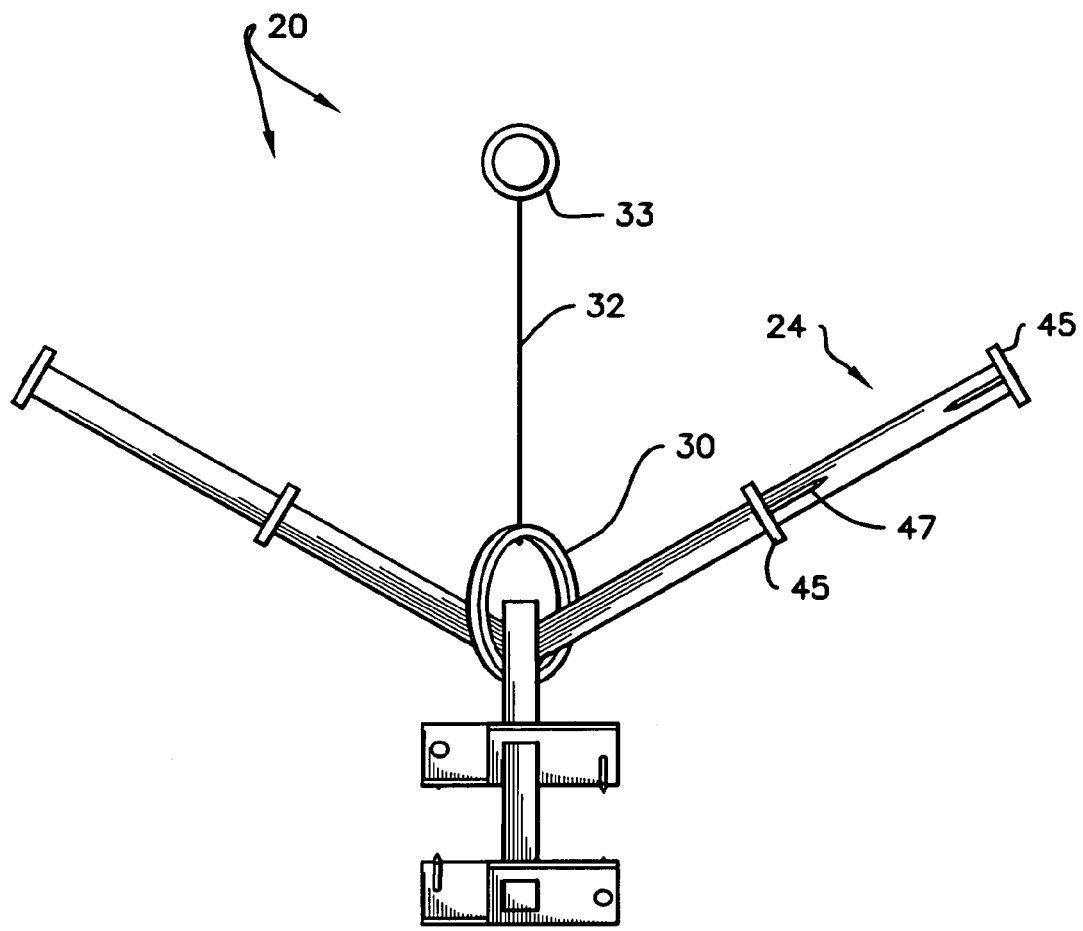
FIG. 2 is a front elevational view of the preferred feeder.
Figure 3:
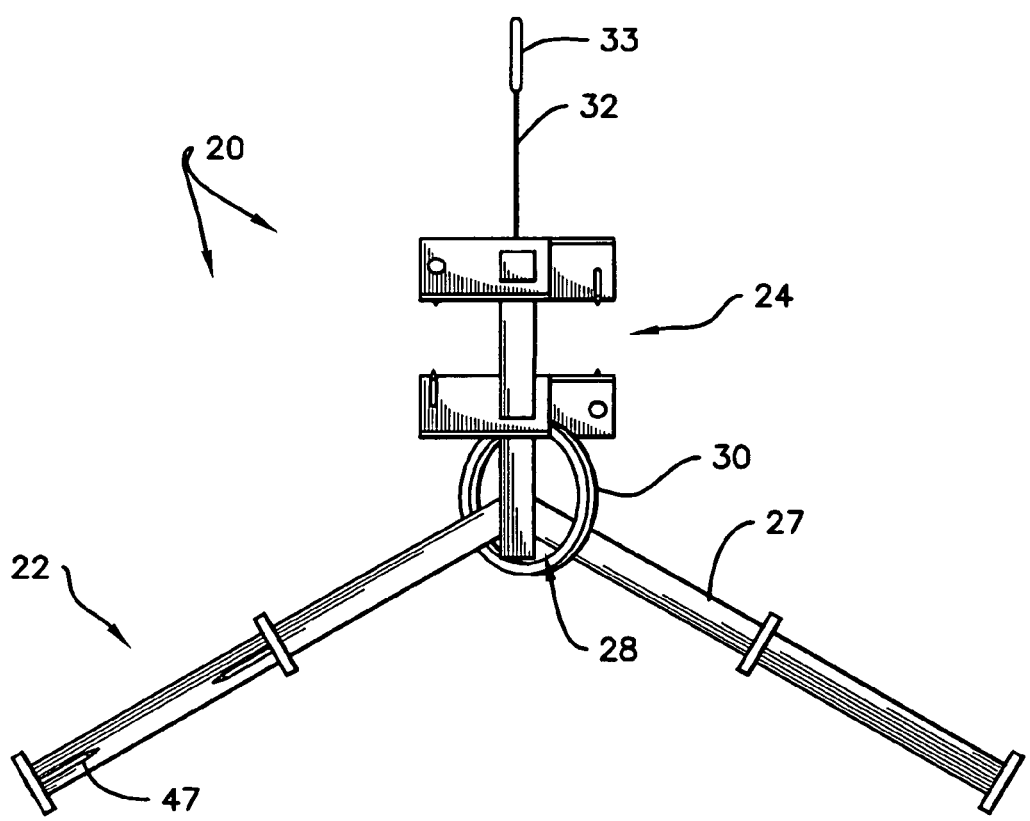
FIG. 3 is a left side elevational view of the preferred feeder.

With initial reference now directed to FIGS. 1–7 of the drawings, a squirrel feeder constructed in accordance with the best mode of the invention has been generally designated by the reference numeral 20. The feeder is metastable, assuming a variety of different orientations and inclinations in response to squirrel movements.

The preferred feeder 20 comprises a pair of cooperating, generally V-shaped ribs 22 and 24, which in the best mode, are identical. As explained in detail hereinafter, each structural rib has a pair of integral wings 26, 27 that diverge outwardly from a central vertex. The vertices 28 of each rib 22, 24 are joined together as in FIGS. 1–5 to form the center of the feeder. The wings project outwardly from the joined vertices 28. The distal ends of the wings 26, 27 occupy the vertices of a virtual tetrahedron.

During assembly, a rigid, preferably circular mounting ring 30 is positioned as illustrated proximate the assembled vertices, and a suitable cord or string 32 tied to ring 30 suspends the feeder 20. String 32 can lead to an optional auxiliary ring 33 that is directly fitted over a branch 34 (FIG. 1) or other support. Alternatively, cord 32 could be tied directly to branch 34 or the like. Ring 30 loosely holds the feeder, allowing limited rotations of the ribs while preventing the feeder from dropping. Since the circular interior of ring 30 provides so much clearance space about the joined vertices at the center of the wings, numerous movements and displacements of the feeder are possible. When, for example, a squirrel lands upon a particular wing, the feeder becomes unbalanced, and the wings rotate and move in response (i.e., FIGS. 8–11).

Figure 5:
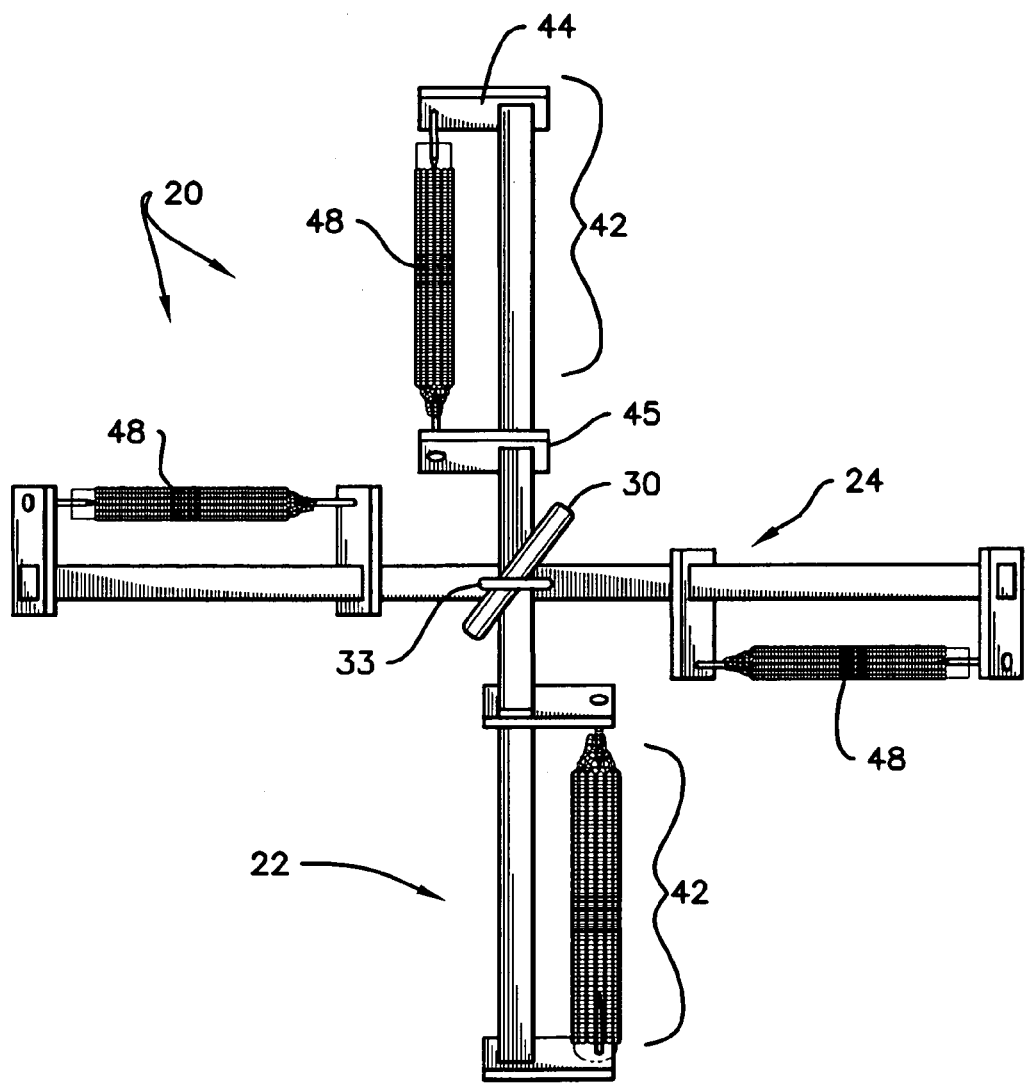
FIG. 5 is a top plan view of a loaded feeder.
Figure 6:
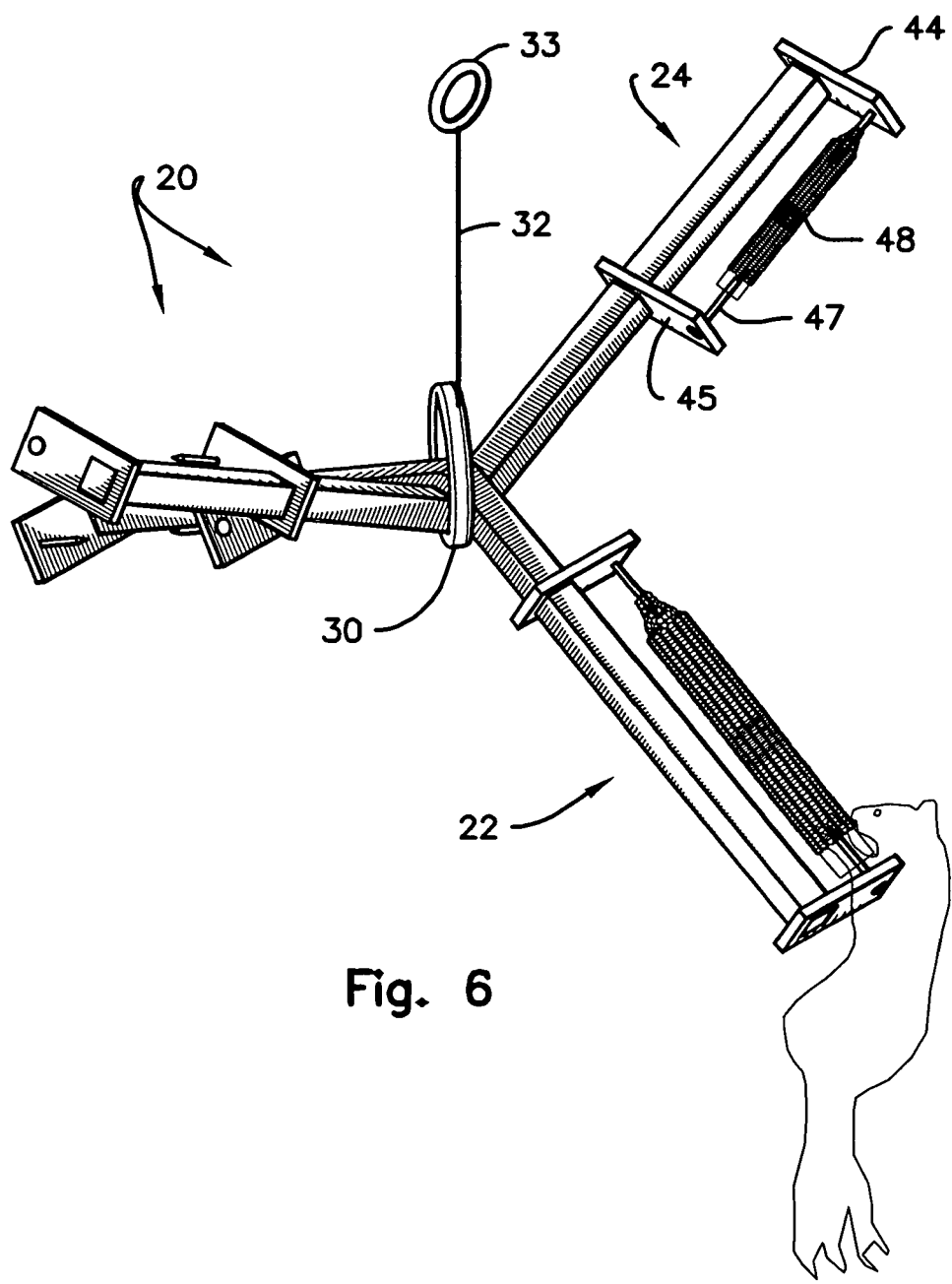
FIG. 6 is an isometric view of the preferred feeder, with some corn cobs attached.
Figure 7:
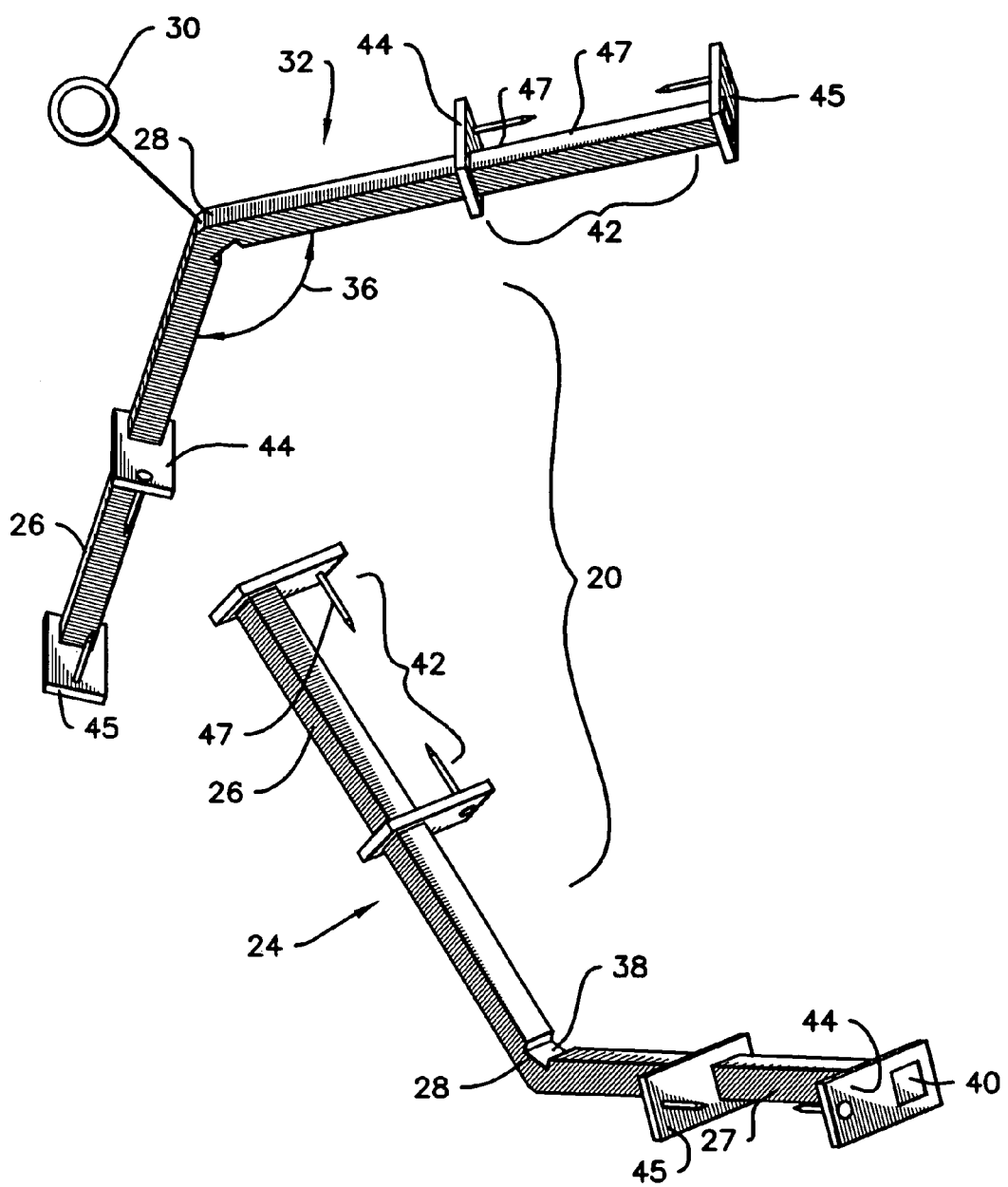
FIG. 7 is an exploded isometric view of an unloaded feeder.
Figure 8:
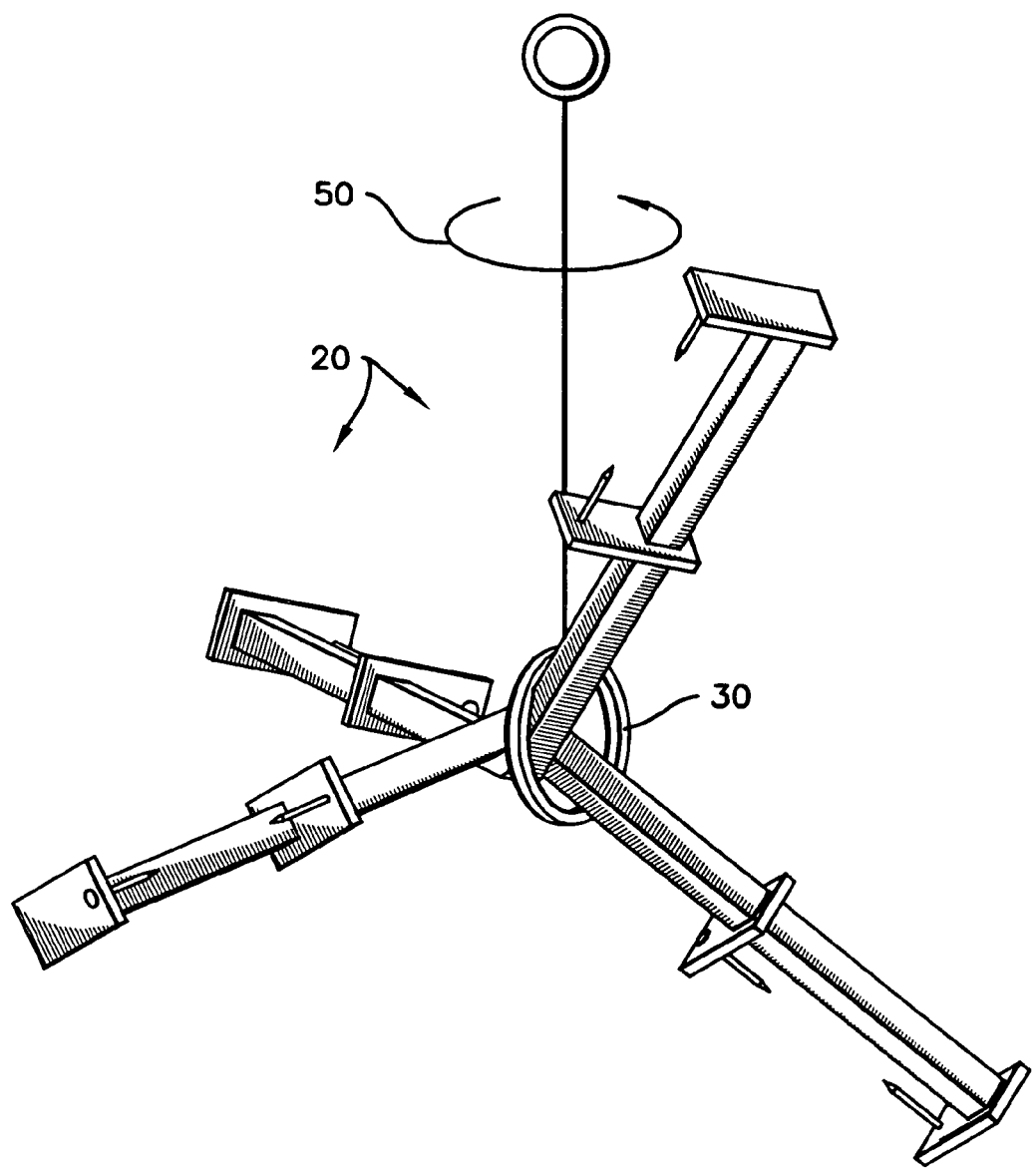
FIGS. 8–11 are isometric views of the preferred feeder, showing how it can tilt and move, with corn cobs omitted for clarity.
Figure 9:
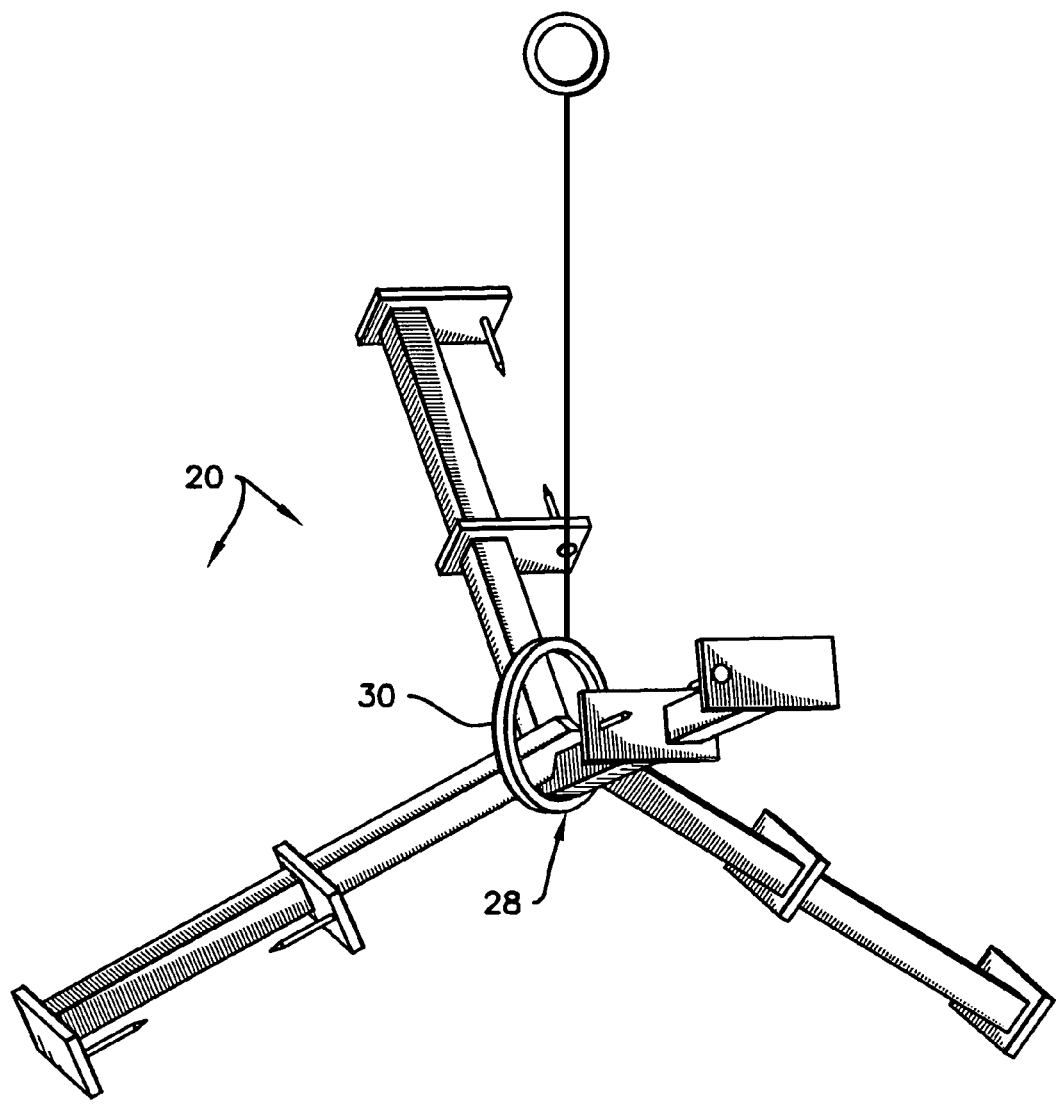

With primary reference now directed to FIGS. 5–7, each rib 22, 24 is preferably identical. Each rib comprises a pair of integral, outwardly extending, wings 26, 27 that comprise a generally square cross section. Each wing diverges outwardly from the central rib vertex 28 (i.e., FIG. 7). The preferred angle between each wing, designated generally by the arrow 36 (FIGS. 1, 7), is between one hundred and one hundred and fifty degrees. The best mode angle is one hundred and twenty degrees.

Each rib is preferably made from wood, but they may be made from plastic or metal. The individual wings 26, 27 each include a notch 38 formed in their vertex 28 (FIG. 7). These notches are mated when the twin ribs are fitted together during assembly. Each wing has a most distal end, and as seen in FIG. 7, the distal end of wing 27 has been designated by the reference numeral 40. After assembly, the distal ends 40 of each wing 26, 27 are positioned generally at the vertices of a virtual tetrahedron.

Figure 4:
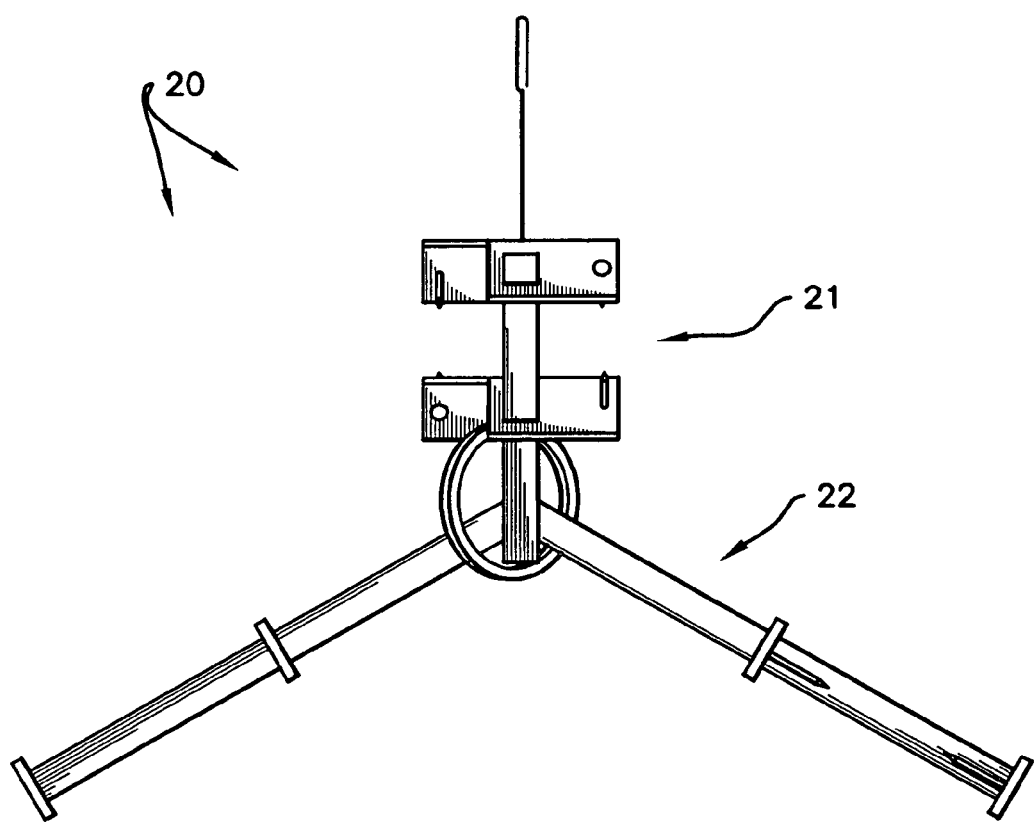
FIG. 4 is a right side elevational view of the preferred feeder.

There are adjustable feed holders, generally designated by the reference numeral 42, disposed adjacent the distal ends of each wing. As best seen in FIG. 4, each feed holder comprises a fixed bracket 44 disposed at the distal end of the wing, and a slidably adjustable bracket 45 disposed closer to the vertex region 28. The spaced apart brackets 44 and 45 are parallel, both are generally rectangular, and both are preferably made from wood. Bracket 45 has a suitable square clearance hole through which the body of the wing extends. Each bracket 44, 45 has a rigid spike 47 (i.e., an iron nail) projecting towards the opposite bracket that is adapted to penetrate and secure an item of feed sandwiched between the brackets. Corncobs 48 (i.e., FIGS. 5, 6), that are preferred for feeder 20, are easily captivated and aligned between the brackets 44 and 5 by the spikes that forcibly penetrate their ends. However, other types of solid feed, such as suet, peanut brittle, loaves of bread, or the like, may be held by and between holder brackets 44, 45. However, corncobs are preferred for squirrel feeding.

To mount a corncob 48, bracket 45 is first grasped and moved manually away from the wind distal end. It is designed to simply slide along the wing, being captivated upon the wing and constrained thereby. With the spike 47 exposed on the fixed bracket 44, an ear of corn is mounted by forcing the cob end unto the spike 47. Care should be taken to insure that the cobs 48 are mounted substantially parallel with the wings. Afterwards, the opposite end of a cob is penetrated by the spike 47 from a moveable bracket 45, which the user forcibly slides into place to complete cob mounting. When all of the corn is depleted, empty cobs may be removed by sliding bracket 45 away from bracket 44, and axially pulling the spent cob loose.

During assembly, each rib 22, 24 (i.e., FIG. 7) is oriented parallel with one another, and then the mounting ring 30 is ring positioned proximate the vertice 28 of each rib. At this point, the ribs can be positioned perpendicular to one another, with their vertices 28 pointing in opposite directions, such that the rib notches 38 are coupled and joined. Brackets 44 and 45 are then affixed to the wings. As mentioned, bracket 44 is slidably adjustable along the length of the wing, but a bracket 45 is fixed in position at the distal ends of each wing. With the assembly completed, the string or cord 32 is simply attached to ring 30, and the feeder 20 is suspended from a suitable support 34 (FIG. 1) with or without the optional auxiliary ring 33.

Figure 10:
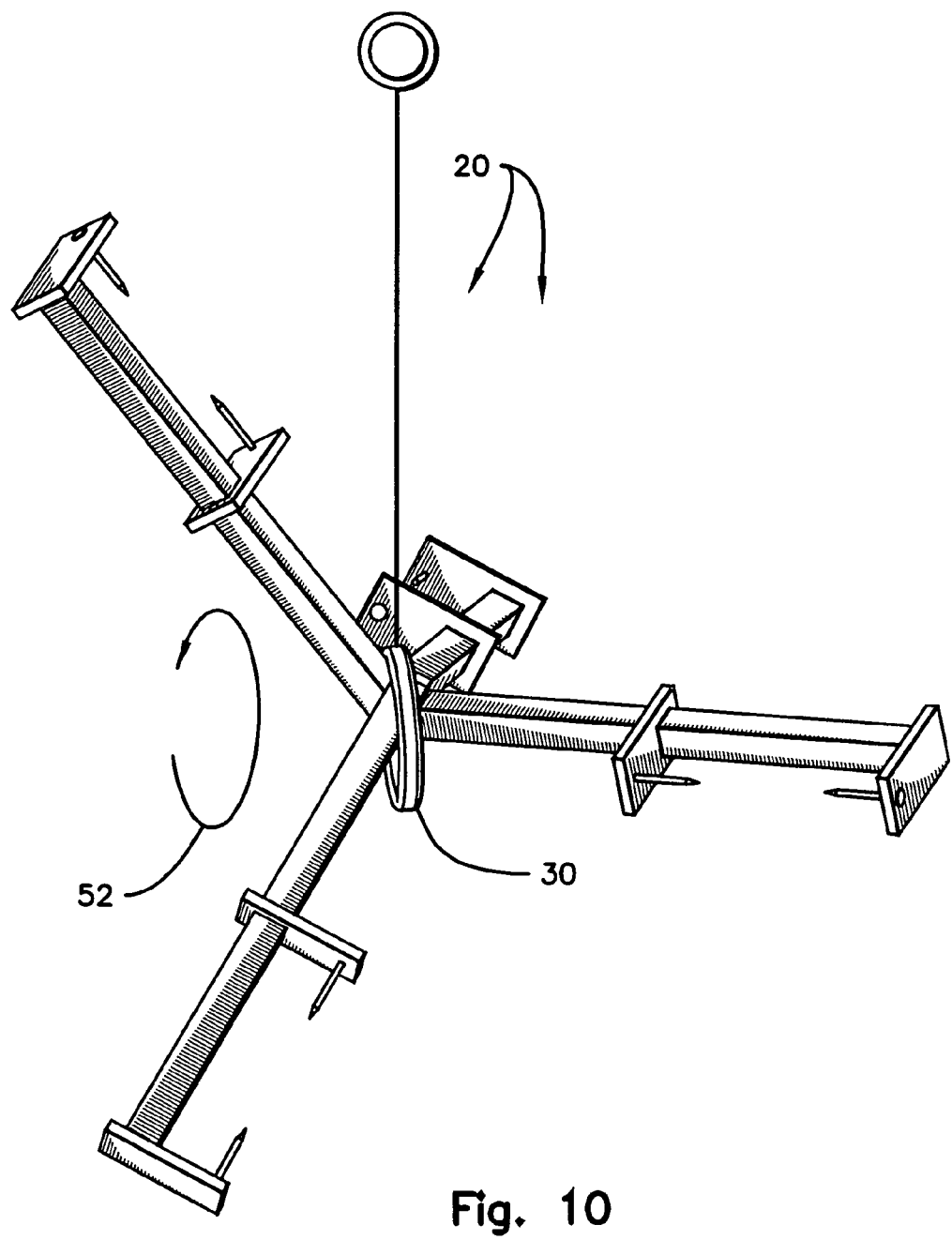
Figure 11:
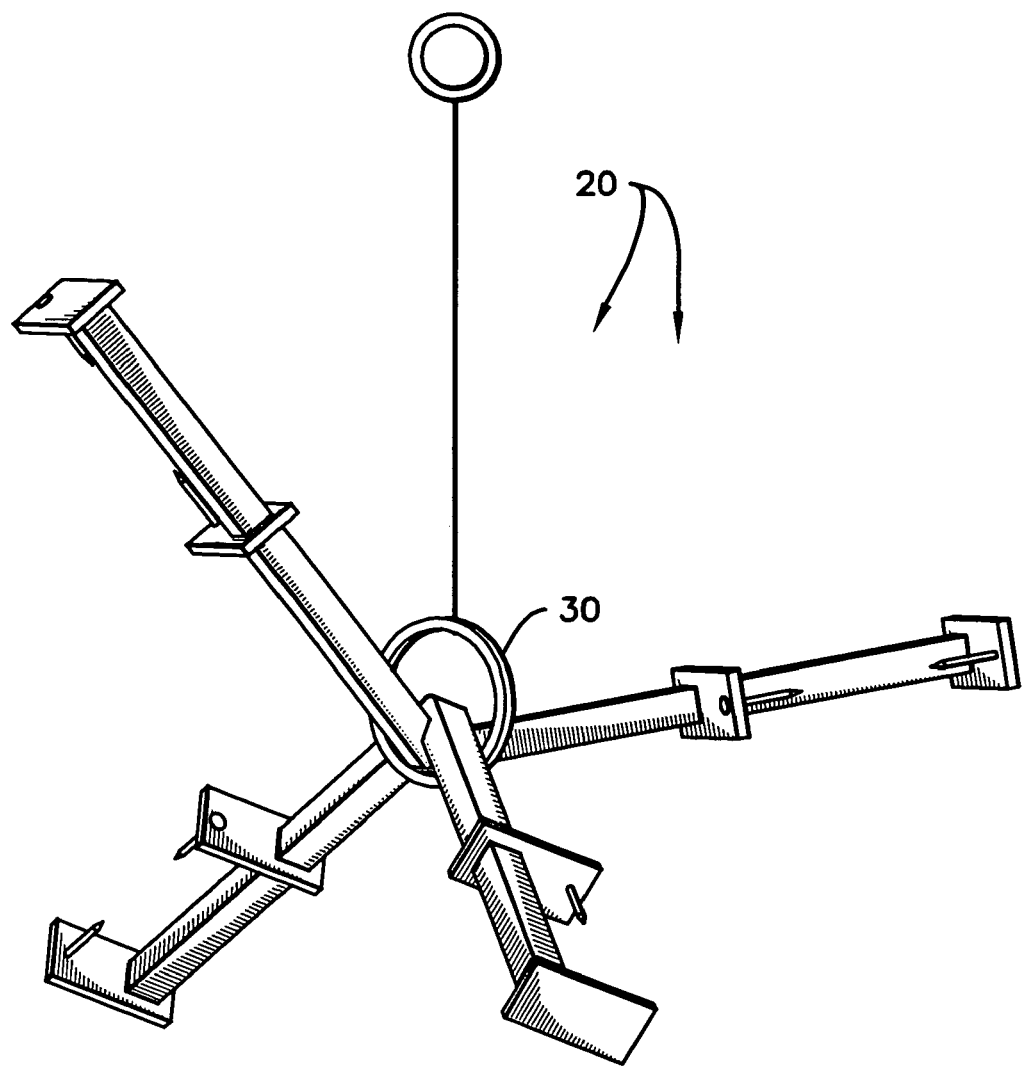

Referencing FIGS. 8–11, it will be appreciated that the loose mounting established by ring 30 relative to the rib vertices 28 enables a variety of rotational movements. For example, one rotational direction enabled by the instant configuration is indicated by arrow 50 in FIG. 8. The feeder may rotate as indicated by arrow 50 in FIG. 8 to the position illustrated generally in FIG. 9, moving through several intermediate positions influenced by both the motion and position of visiting squirrels. Rotation about a plane orthogonal to arrow 50 is indicated by arrow 52 (FIG. 10). Rotational displacement indicated generally by arrow 52 enables movement between the position illustrated in FIG. 10 to that illustrated generally in FIG. 11. Of course, in actual operation, complex rotational motions are possible. Moreover, limited rotation is possible in directions opposite from that indicated in arrows 50, and 52. Complex movements involving various vector directions result from a combination of rotational moments corresponding generally to possible rotation indicated by arrows 50, and 52 (i.e., FIGS. 8, 10).

Given the numerous movements that are possible, and the wide range of rotational displacements, it is preferred to minimize mechanical interference between parts. In the best mode, the corn cob holders 42 mounted on opposite rib wings are positioned on opposite sides of the wings. Thus, for example, noting FIG. 5, the corn cob 48 in the "north" position is on the opposite side corn cob at the "south" position along rib 22. Similarly, the corn cob seen in the "west" position (i.e., the left side of rib 24 as viewed in FIG. 5) is disposed on the side of the rib opposite from the corn cob seen at the right. This preferred staggered corn cob mounting arrangement maximizes the potential range of movements of the feeder 20.

From the foregoing, it will be seen that this invention is one well adapted to obtain all the ends and objects herein set forth, together with other advantages which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

What is claimed is:

1. A feeder for animals such as squirrels, chipmunks or the like, said feeder comprising:
   a pair of coupled, generally V-shaped ribs, each rib comprising projecting wings diverging away from a central vertex;
   the ribs coupled together at their vertices forming a center of the feeder;
   wherein each wing comprises at least one feed holder;
   a mounting ring non-rigidly captivating the center of the feeder for suspending the feeder above ground; and,
   whereby the ribs are allowed to rotate generally about their vertices.

2. The feeder as defined in claim 1 wherein each of the wings terminates in ends occupying the vertices of a virtual tetrahedron.

3. The feeder as defined in claim 1 wherein the angle between the wings of each rib is between one hundred and one hundred and fifty degrees.

4. The feeder as defined in claim 1 wherein each rib comprises a notch at its vertex enabling a pair of ribs to be mated during assembly.

5. The feeder as defined in claim 1 wherein each feed holder is adapted to hold corncobs.

6. The feeder as defined in claim 5 wherein the feed holders each comprise a fixed bracket disposed at a distal end of the wing and a slidably adjustable bracket adapted to be moved towards or away from said fixed bracket, each of said brackets comprising a spike adapted to penetrate and secure the feed.

7. The feeder as defined in claim 6 wherein the angle between the wings of each rib is between one hundred and one hundred and fifty degrees.

8. The feeder as defined in claim 7 wherein the angle between the wings of each rib is approximately one hundred and twenty degrees.

9. A squirrel feeder comprising:
   a pair of coupled, generally V-shaped ribs, each rib comprising projecting wings symmetrically diverging away from a central vertex;
   wherein the ribs are coupled together at their vertices forming a center of the feeder;
   a pair of spaced-apart feed holders disposed on each wing;
   a mounting ring non-rigidly encircling the vertices of the ribs for suspending the feeder above ground; and,
   whereby the ribs are allowed to rotate generally about their vertices.

10. The feeder as defined in claim 9 wherein each of the wings terminates in ends occupying the vertices of a virtual tetrahedron.

11. The feeder as defined in claim 9 wherein the angle between the wings of each rib is approximately one hundred and twenty degrees.

12. The feeder as defined in claim 9 wherein each rib comprises a notch at its vertex enabling a pair of ribs to be mated during assembly.

13. The feeder as defined in claim 9 wherein the feed holders each comprise a fixed bracket disposed at a distal end of a wing and a slidably adjustable bracket adapted to be moved towards or away from said fixed bracket, each of said brackets comprising a spike adapted to penetrate and secure the feed.

14. The feeder as defined in claim 13 wherein each of the spaced apart feed holders is adapted to hold corncobs.

15. A corncob feeder for squirrels comprising:
   a pair of coupled, generally V-shaped ribs, each rib comprising projecting wings diverging away from a central vertex, each rib having a pair of sides;
   wherein the ribs are coupled together at their vertices;
   spaced-apart corncob holders disposed on each wing;
   a mounting ring non-rigidly encircling the ribs for mounting the feeder; and,
   whereby the ribs are allowed to rotate generally about their vertices.

16. The feeder as defined in claim 15 wherein each of the wings terminates in ends occupying the vertices of a virtual tetrahedron.

17. The feeder as defined in claim 15 wherein the angle between the wings of each rib is approximately one hundred and twenty degrees.

18. The feeder as defined in claim 15 wherein each rib comprises a notch at its vertex enabling a pair of ribs to be mated during assembly.

19. The feeder as defined in claim 15 wherein the corncob holders each comprise a fixed bracket disposed at a distal end of a wing and a slidably adjustable bracket adapted to be moved towards or away from said fixed bracket, each of said brackets comprising a spike adapted to penetrate and secure a corncob.

20. The feeder as defined in claim 15 wherein a corn cob holder at one end of each rib is disposed on the side of the rib opposite from the side occupied by the holder at the opposite rib end.

* * * * *